Dec. 10, 1935.   B. G. DAW   2,023,668
ELECTROPLATING APPARATUS
Filed Sept. 18, 1933   2 Sheets-Sheet 1
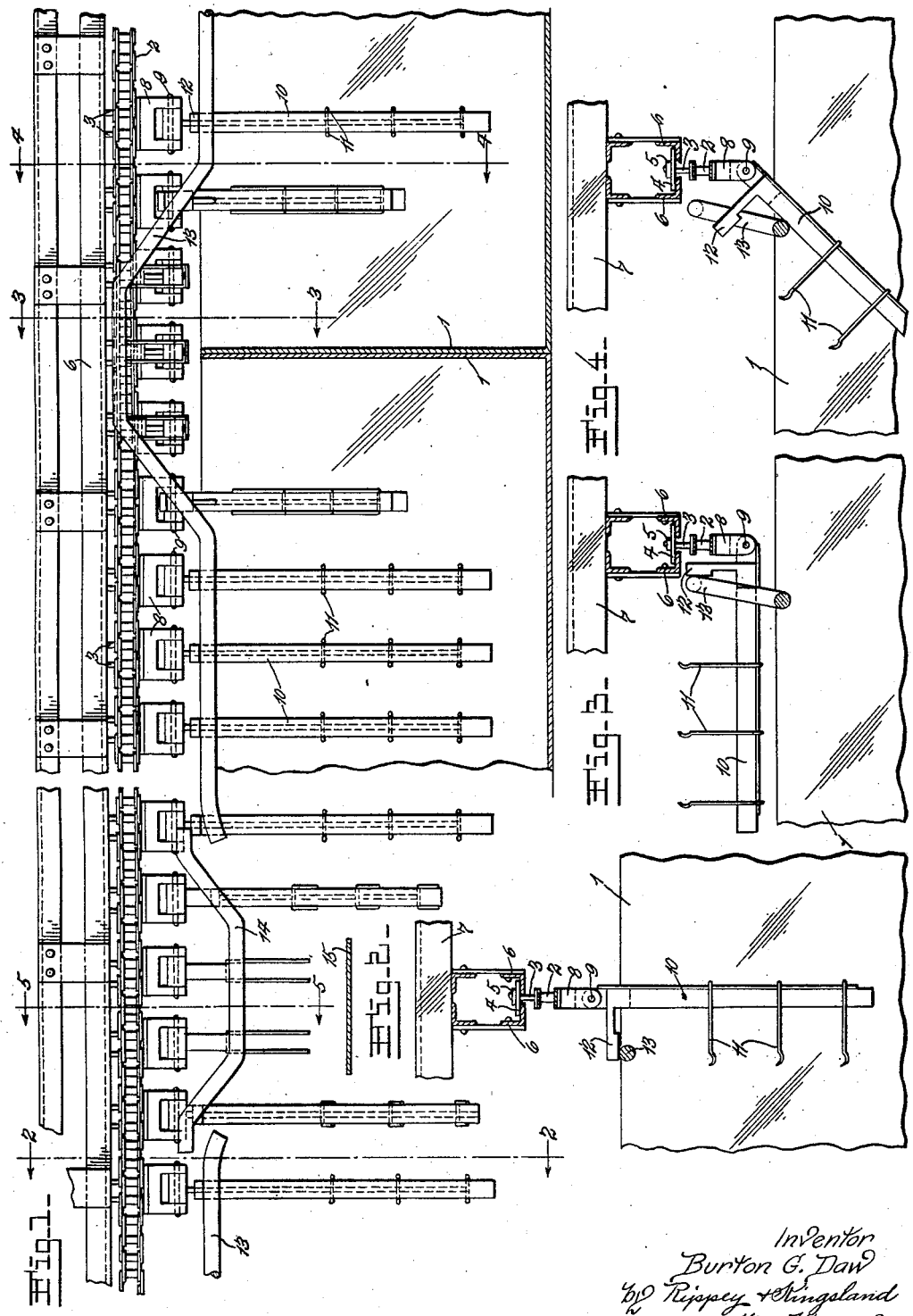
Inventor
Burton G. Daw
by Rippey & Kingsland
His Attorneys Dec. 10, 1935.   B. G. DAW   2,023,668
ELECTROPLATING APPARATUS
Filed Sept. 18, 1933   2 Sheets-Sheet 2
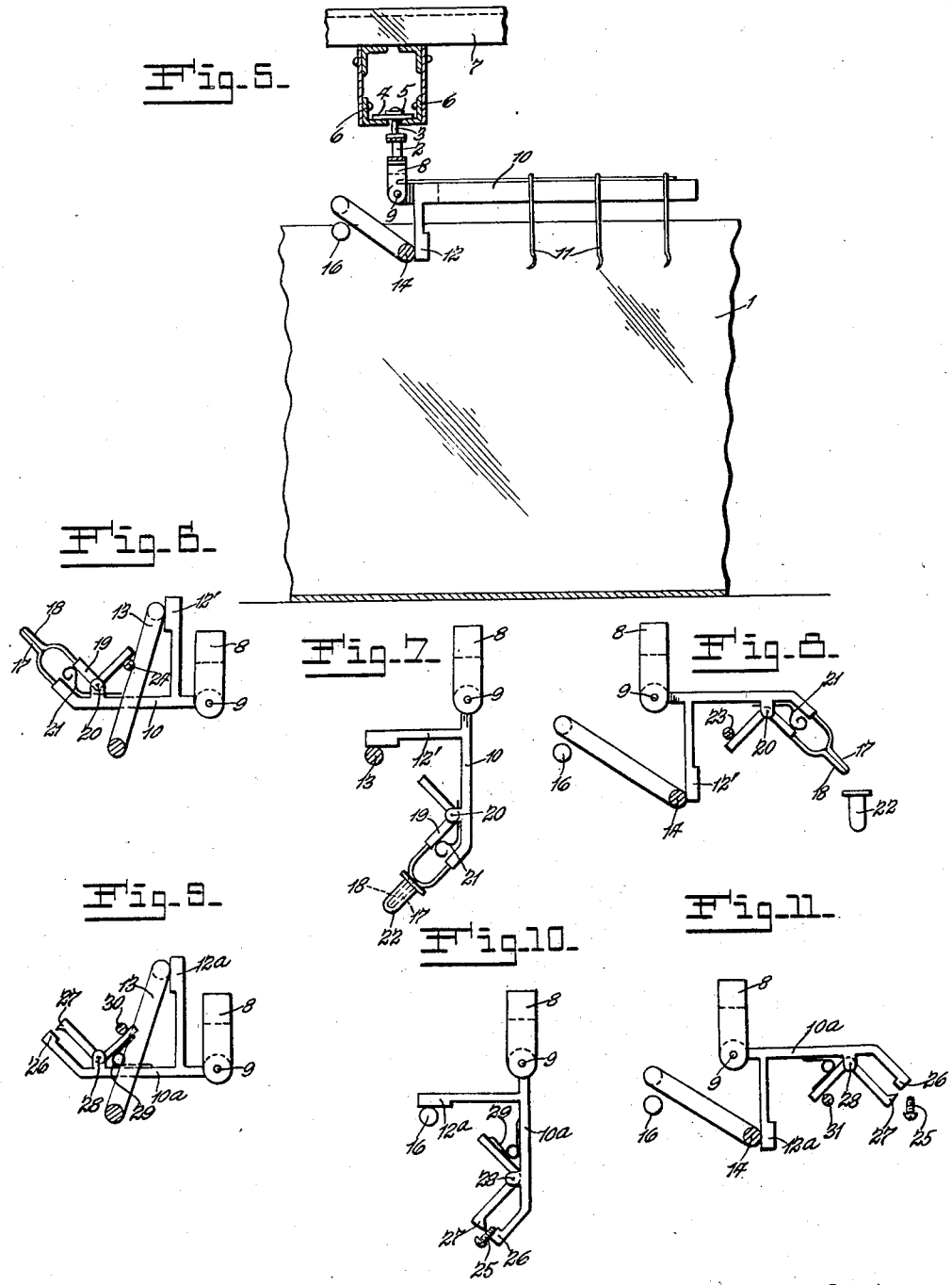

Patented Dec. 10, 1935

2,023,668

UNITED STATES PATENT OFFICE 2,023,668

ELECTROPLATING APPARATUS

Burton G. Daw, Webster Groves, Mo.

Application September 18, 1933, Serial No. 689,845

3 Claims. (Cl. 204—5)

This invention relates to electro-plating apparatus, and has special reference to mechanism for supporting and moving the work or articles to be plated through a series of solution tanks.

In general the present invention comprises a continuously moving endless conveyor pivotally supporting a series of work supports upon which the articles to be plated are mounted, cam or guide devices for raising the work supports at the ends of the respective tanks so as to permit the work supports to pass over the ends of said tanks and from one tank to another and then to extend downwardly to immerse the work on said supports in the solution in the respective tanks, and cam or guide devices for operating the work supports to discharge work therefrom after the work has been passed through the respective solution tanks.

An object of the invention is to provide an improved electro-plating apparatus embodying a series of work supports pivotally mounted in connection with an endless and continuously operating conveyor, and mechanism for operating and moving said work supports as required to extend them downwardly to immerse the work in a solution in a series of solution tanks and to raise the work supports above the end walls of the solution tanks to permit them to pass from one solution tank to another without obstruction, and mechanism for operating the work supports in another direction to discharge the work therefrom.

Other objects of the invention will be readily apparent from the following description, reference being made to the annexed drawings, in which—

Fig. 1 is a side elevation of a sufficient portion of an electro-plating apparatus embodying the present invention to afford an understanding of duplications of the parts shown in a complete electro-plating apparatus.

Fig. 2 is a vertical sectional view on the line 2—2 of Fig. 1.

Fig. 3 is a vertical sectional view on the line 3—3 of Fig. 1, showing the position of the work supports in passing over the end walls of adjacent solution tanks.

Fig. 4 is a sectional view on the line 4—4 of Fig. 1, illustrating further the manner in which the work supports are operated.

Fig. 5 is a sectional view on the line 5—5 of Fig. 1, showing a work support in position to discharge the work therefrom.

Fig. 6 is a view showing a work support of a different type in position to have an article to be plated mounted thereon.

Fig. 7 is a view of the same work support having the article mounted thereon and in the position it occupies when in the solution.

Fig. 8 is a view showing the same work support in the position it occupies when the work is discharged therefrom after having been plated.

Fig. 9 is a view showing a clamping type of work support in open position to receive an article between the jaws of the clamp.

Fig. 10 is a similar view showing this work support in the position it occupies while supporting the work in the solution.

Fig. 11 is a view of the same work support discharging the work therefrom.

The tanks 1 may be considered as two of a series or rows of tanks containing solution through which the articles to be plated are moved by operation of this invention.

An endless conveyor 2, which in the present instance is a chain, has certain of the link pivots 3 extended upwardly. Plates or discs 4 in the general form of washers are attached to the upper ends of the extended pivots 3 by nuts 5 and these plates or discs 4 are mounted for sliding movements on the inwardly extended flanges of angle bars 6 supported by a strong frame 7. The chain may be operated by any suitable mechanism or gearing. The pivots 3 are also extended downwardly and certain pairs of said pivots support brackets 8, each having near its lower end a pivot 9 on which a work supporting rack member 10 is pivoted for swinging movements. The work supporting member 10 may be provided with a series of rack arms 11 on which the articles to be plated may be mounted and each member 10 is also provided near its upper end with a rigid laterally extended arm 12.

The arms 12 are arranged so that they will extend over and operate along and against cam members 13 mounted above the end walls of each pair of adjacent solution tanks 1. Accordingly, when the work supports 10 are moved laterally the arms 12 operate against the cams 13 and thereby swing the members 10 from downwardly extended vertical position to approximately horizontal position, as shown in Fig. 3, and support said members 10 in said approximately horizontal position long enough for said members 10 to pass over the end walls of the solution tanks 1. After passing over the end walls of the solution tanks 1, the members 10 again swing downwardly because of the formation of the cam members 13, as should be understood by reference to Fig. 1.

This construction may be duplicated for as many solution tanks as are provided and the illustration and description given is intended to apply to the duplication of these features.

After the work has been passed through all of the solution tanks and subjected to the action of the electrolytic solution, it is desirable to discharge the article from these work supports. For this purpose I provide a cam 14 disposed at an angle with respect to the cams 13, so that the upper side of the arms 12 will operate against this cam 14 and thereby swing the members 12 upwardly in the opposite direction, so that the arms 11 are extended downwardly, as shown in Fig. 5. This will discharge the plated articles from said arms 11 into any suitable receptacle or onto a conveyor 15 (Fig. 1). After leaving the cam 14, the arms 12 pass into engagement with a guide rail 16 whereby the members 12 are substantially held from swinging movements and are guided properly until reloaded, and thereafter to and through the respective solution tanks in the manner described.

It is apparent that different types of work supports may be substituted for the supporting members 10. For instance, the work supports shown in Figs. 6, 7 and 8 may be used. As there shown, a supporting member 10' is mounted on the pivot 9 and has a laterally extended arm 12' designed and adapted to operate against the cams 13 and against the cam 14 in the same manner that the arms 12 operate against said cams. The work support in connection with the arm 10' comprises a finger 17 attached to the end of the member 10', and the cooperating finger 18 attached to the end of an angular lever 19 mounted on a pivot 20 supported by the member 10'. A spring 21 actuates the finger 18 away from the finger 17.

The fingers 17 and 18 are designed and intended to be extended into hollow or cylindrical or tubular articles 22, or into any articles provided with openings that will receive the fingers 17 and 18. The spring 21 spreads apart the fingers 17 and 18 and causes them to engage the inner surfaces of the articles placed thereon and thereby frictionally support said articles. Beyond the last solution tank a cam rail 23 is appropriately supported in position to be engaged by the free arm of the angular lever 19 so as to move the finger 18 toward or into contact with the finger 17 and prevent the fingers 17 and 18 from being pressed against the inner surface of the article 22. This will permit the article 22 to drop from said fingers into an appropriate receptacle or ont the conveyor 15. After passing from the cam device 23 the angular lever 19 engages a reverse cam 24 which presses the fingers 17 and 18 toward each other, so that another article may easily be placed thereon. After the article is placed on the fingers 17 and 18 the angular lever 19 moves from the cam 24 and thereafter automatically immerses the article in the solution in the respective solution tanks in a manner that should be understood from the preceding description.

The work support illustrated in Figs. 9, 10 and 11 is designed and adapted to support such articles as screws 25, or other articles that may not be conveniently mounted on the arms 11 or on the device shown in Figs. 6, 7 and 8.

The article support shown in said Figs. 9, 10 and 11 comprises a member 10ᵃ mounted on the pivot 9 and having an arm 12ᵃ designed and adapted to operate against the cams 13 and 14 in the same manner that the arms 12 operate against said cams. One end of the member 10ᵃ is formed with a jaw 26 and an angular cooperating jaw 27 is mounted on a pivot 28 supported by the member 10ᵃ. A spring 29 is mounted in position to cooperate with the angular jaw 27 to press said jaw toward the jaw 26 and thereby clamp articles, such as the article 25, between said jaws. The jaw 27 at loading position is moved away from the jaw 26 by a cam 30 engaging against the free end of the angular jaw 27, as shown in Fig. 9.

In unloading position the arm 12ᵃ is against the cam 13, as shown in Fig. 11, and the free end of the angular jaw 27 is against a cam 31 (Fig. 11) which releases the jaw 27 from the article 25 and permits said article to drop into a suitable receptacle or onto the conveyor 15.

Obviously different types of work supports may be interchanged with those shown and I contemplate such substitution as may be found desirable.

It should now be apparent that this invention operates with speed and precision to subject different types of work to the electro-plating process and subsequently discharge the different types of work from the supports therefor. Numerous changes and variations in the construction and arrangement of the parts may be made without departure from the nature and principle of the invention. I do not restrict myself in any unessential particulars, but what I claim and desire to secure by Letters Patent is:—

1. In an electro-plating apparatus, a movable support, a work supporting member pivotally connected with said support for swinging movements in opposite directions from downwardly extended position, a laterally extended arm rigid with said member, a cam engaged by said arm during movement of said member and said arm to move said member upwardly in one direction, and an additional cam disposed angularly with respect to said first named cam and engaged by said arm to swing said member upwardly in the opposite direction during movement of said member.

2. In an electro-plating apparatus, a series of solution tanks, a support mounted above said tanks for continuous horizontal movement, a work carrier pivotally supported by said support and depending therefrom and adapted to be moved through said tanks successively, a laterally extended arm rigid with said carrier, a cam engaged by said arm during movement of said carrier and said arm to move said carrier upwardly in one direction above the adjacent walls of said tanks to permit said work carrier to pass from one tank to another, and an additional cam disposed angularly with respect to said first named cam and engaged by said arm to swing said carrier upwardly in the opposite direction during movement of said carrier.

3. In an electro-plating apparatus, a continuously moving support, a clamping device pivotally supported by said support for engaging and supporting the work, a laterally extended arm rigid with said support, a cam engaged by said arm during movement of said support and said arm to move said support upwardly in one direction, an additional cam engaged by said arm to swing said arm upwardly in the opposite direction, and means for disengaging said clamping device from the work.

BURTON G. DAW.